United States Patent
Myeong et al.

(10) Patent No.: US 7,957,836 B2
(45) Date of Patent: Jun. 7, 2011

(54) METHOD USED BY ROBOT FOR SIMULTANEOUS LOCALIZATION AND MAP-BUILDING

(75) Inventors: Hyeon Myeong, Suwon-si (KR); Sungi Hong, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1502 days.

(21) Appl. No.: 11/175,396

(22) Filed: Jul. 7, 2005

(65) Prior Publication Data

US 2006/0041331 A1  Feb. 23, 2006

(30) Foreign Application Priority Data

Aug. 5, 2004  (KR) .................. 10-2004-0061790

(51) Int. Cl.
*G01C 21/00* (2006.01)
(52) U.S. Cl. .......... 700/253; 700/245; 700/254; 701/26; 701/207; 701/208; 701/300

(58) Field of Classification Search .............. 700/245, 700/253, 254; 701/23, 25, 26, 27, 200, 205, 701/207, 208, 210, 216, 217, 223, 224, 300
See application file for complete search history.

(56) References Cited

U.S. PATENT DOCUMENTS

2004/0167716 A1* 8/2004 Goncalves et al. .......... 701/217

OTHER PUBLICATIONS

Duckett, Tom, A Genetic Algorithm for Simultaneous Localization and Mapping, Sep. 2003, IEEE International Conference on Robotics & Automation, pp. 434-439.*

* cited by examiner

*Primary Examiner* — Khoi Tran
*Assistant Examiner* — Spencer Patton
(74) *Attorney, Agent, or Firm* — Staas & Halsey LLP

(57) ABSTRACT

A method used by a robot for simultaneous localization and map-building, including: initializing a pose of the robot and locations of landmarks; sampling a new pose of the robot during motion of the robot, and constructing chromosomes using the locations of the landmarks; observing the landmarks from a present location of the robot; generating offspring from the chromosomes; and selecting next-generation chromosomes from the chromosomes and the offspring using observation values of the landmarks.

22 Claims, 6 Drawing Sheets

METHOD USED BY ROBOT FOR SIMULTANEOUS LOCALIZATION AND MAP-BUILDING

CROSS-REFERENCE TO RELATED APPLICATION

This application claims the benefit of Korean Patent Application No. 2004-0061790, filed on Aug. 5, 2004, in the Korean Intellectual Property Office, the disclosure of which is incorporated herein by reference.

BACKGROUND OF THE INVENTION

1. Field of the Invention

The present invention relates to a method used by a robot for localization and map-building, and more particularly, to a method used by a mobile robot for simultaneous localization and map-building (SLAM).

2. Description of Related Art

In order for a robot to navigate through the non-trivial surroundings, the robot must localize itself and build a map of its surroundings. The map as built makes it possible for the robot to plan its path, manipulate an object, or communicate with humans, etc.

In order to navigate through unknown surroundings, a robot has to build a map while localizing itself. However, since the robot localizes itself and builds a map by using sensor data having noise, there is difficulty in the calculation.

Localization means understanding of the absolute location of a robot in its surroundings by using sensor information, beacons or natural landmarks, etc. Since there are several sources of error in localizing the robot (a wheel slipping on the ground, a change in the diameter of the wheel, etc.) during the navigation of the robot, the error requires a correction.

Map-building models the surroundings by observing natural or manmade landmarks based on the sensor data. Such modeling makes it possible for the robot to plan its path. In order to model complex surroundings, only when localization is guaranteed, can a reliable map be built. Therefore, a method of simultaneously performing localization and map-building within a specified short time is required.

BRIEF SUMMARY

An aspect of the present invention provides a method used by a robot for simultaneous localization and map-building which estimates the path of the robot by using a particle filter and estimates the location of landmarks by introducing an evolutionary computation to build a map.

According to an aspect of the present invention, there is provided a method used by a robot for simultaneous localization and map-building, including: initializing a pose of the robot and locations of landmarks; sampling a new pose of the robot during motion of the robot, and constructing chromosomes using the locations of the landmarks; observing the landmarks from a present location of the robot; generating offspring from the chromosomes; and selecting next-generation chromosomes from the chromosomes and the offspring using observation values of the landmarks.

According to another aspect of the present invention, there is provided a method of simultaneous localization and map-building, including: initializing a pose of a robot and a location of a landmark, the orientation including a direction in which a front of the robot faces and x,y coordinates indicating a location of the robot; sampling a new position of the robot as the robot moves; constructing a chromosome for an evolutionary computation, the chromosome indicating the location of the landmark and being an object in the evolutionary computation; observing the landmark from the new position; determining whether a new landmark is present and, if so, initializing a location of the new landmark using an observed distance and angle from the robot to the landmark; generating, when a new landmark is determined not to be present, offspring from a present parent chromosome according to the evolutionary computation method; evaluating fitness of the parent and the offspring, fitness being defined as an objective function according to a difference between an observation value and a prediction value of each landmark; and selecting a next generation chromosome from the parents and the offspring based on fitness values.

According to other aspects of the present invention, the aforementioned methods can be realized by computer-readable storage media encoded with processing instructions for causing a processor to perform the operations of the methods.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
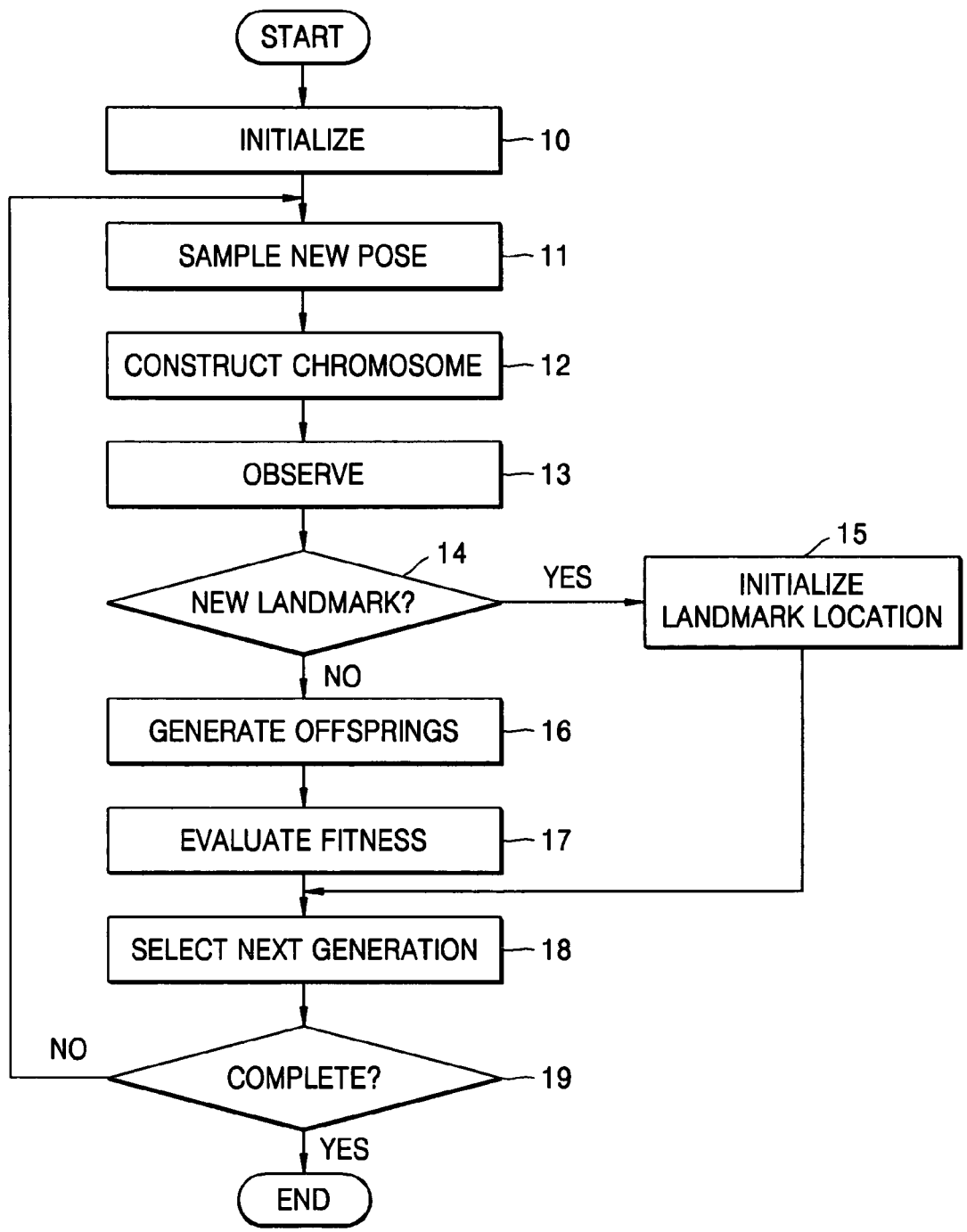
FIG. 1 is a flowchart illustrating a method of simultaneous localization and map-building according to an embodiment of the present invention.

Reference will now be made in detail to an embodiment of the present invention, examples of which are illustrated in the accompanying drawings, wherein like reference numerals refer to the like elements throughout. The embodiment is described below in order to explain the present invention by referring to the figures.

FIG. 1 is a flowchart illustrating a method of simultaneous localization and map-building according to an embodiment of the present invention. Referring to FIG. 1, first, the pose (i.e., orientation) of a robot and locations of landmarks are initialized (Operation 10). The pose of a robot includes a direction in which the front of the robot faces, besides (x,y) coordinates indicating a location of the robot. Since the present embodiment adopts (i.e., uses) a particle filter to localize the robot, a plurality of particles are generated in the surrounding of the initial pose of the robot in order for the initialization. The surrounding of the initial pose indicates within a range determined experimentally and centered around the initial pose.

Figure 2:
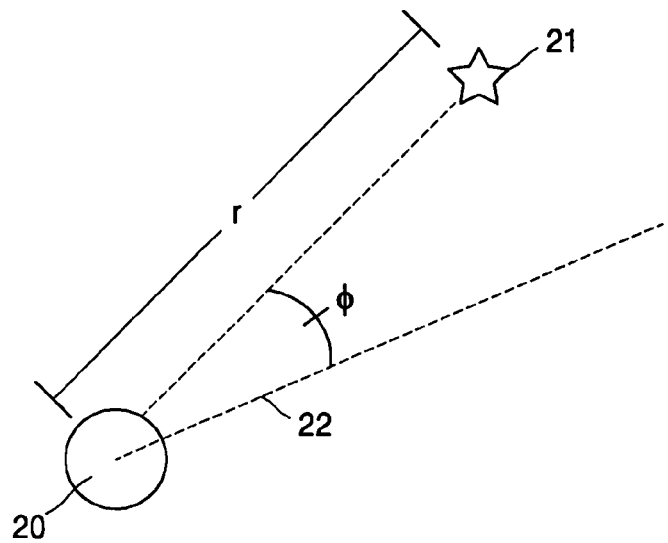
FIG. 2 illustrates an example of a robot observing a landmark.

The initialization of locations of landmarks is determined according to results obtained by observing the landmarks from the location of each generated particle. FIG. 2 illustrates an example of observing a landmark from the robot. Referring to FIG. 2, reference numeral 20 indicates a robot, 21 indicates a landmark, and 22 indicates a direction in which the robot faces. Observation may be expressed as the distance r from the robot 20 to the landmark 21 and the angle φ between the direction 22 of the robot 20 and the direction of the landmark 21. If the pose of the robot 20 is expressed as $(S_{t,x}, S_{t,y}, S_{t,\theta})$, the initialization of the landmark location can be set using an inverse function of the observation function $g(s_t, \theta_{nt})$ below based on the observed r, φ values. Although a value t indicates initial time, i.e. 0; after the initialization t indicates the $t^{th}$ time step.

$$g(s_t, \theta_{nt}) = \begin{bmatrix} r(s_t, \theta_{nt}) \\ \phi(s_t, \theta_{nt}) \end{bmatrix} \quad \text{[Equation 1]}$$

$$= \begin{bmatrix} \sqrt{(\theta_{nt,x} - s_{t,x})^2 + (\theta_{nt,y} - s_{t,y})^2} \\ \tan^{-1}\left(\frac{\theta_{nt,y} - s_{t,y}}{\theta_{nt,x} - s_{t,x}}\right) - s_{t,\theta} \end{bmatrix}.$$

The value $\theta_{nt}$ indicates (x,y) coordinate of the landmark $n_t$. The initial location $(\mu_{x,t}, \mu_{y,t})$ of a new landmark is calculated as follows.

$\mu_{x,t} = s_{t,x} + r\cos(\phi + s_{t,\theta})$ $\mu_{y,t} = s_{t,y} + r\sin(\phi + s_{t,\theta})$ [Equation 2]

Returning to FIG. 1, after the initialization is completed, as the robot moves, a new pose of the robot is sampled (Operation 11). A new pose is sampled using a particle filter described below.

If a particle population at time (t−1) is set to $S_{t-1}$, the location or path $s^{t-1,[m]}$ of the particle is calculated using the probability density function below.

$p(s^{t-1}|z^{t-1}, u^{t-1}, n^{t-1})$ [Equation 3]

The u denotes a motion command or a desired motion vector, the n∈{1, . . . , K} denotes a landmark number, and the z denotes an observation value of the location and direction of the landmark.

With regard to each particle m∈{1, . . . , M}, an end point of each path at time t, i.e. the robot pose $s_t^{[m]}$ can be calculated by Equation 5 according to the end point $s_{t-1}^{[m]}$ of the path $s^{t-1,[m]}$ and a motion model of Equation 4 below.

$p(s_t|u_t, s_{t-1})$ [Equation 4]

$s_t^{[m]} \sim p(s_t|u_t, s_{t-1}^{[m]})$ [Equation 5]

The particle population at time t may be expressed as $S_t^P = \{s_t^{[m]}\}_{m=1}^M$.

New particles are distributed in the particle population $S_t^P$ according to the probability density function below.

$p(s^t|z^{t-1}, u^t, n^{t-1})$ [Equation 6]

If the robot pose is determined, chromosomes are constructed for an evolutionary computation (Operation 12). A chromosome, which is expressed as an object in the evolutionary computation method, indicates locations of landmarks discovered in each location of particles in the present embodiment.

The evolutionary computation method is a calculation model used to find an optimal solution for a given problem. The optimal solution can be found by representing potential solutions to real world problems as coded objects over the computer and collecting several objects to form an object group and performing an evolution simulation within the object group according to the survival of the fittest by exchanging genetic information of the objects or furnishing new genetic information to the objects, as generations go by.

The chromosome, (i.e., the landmark location $(\mu_x', \mu_y')$), can be obtained from the predicted value $(\mu_x, \mu_y)$ in previous time described below.

$\mu'_{ix} = \mu_{ix}$ $\mu'_{iy} = \mu_{iy}$ [Equation 7]

The i denotes=1, . . . , N and N is the number of landmarks. The prediction method of $(\mu_x, \mu_y)$ is described later.

Since each particle has a different location, the landmark location can be adjusted considering the displacement of each particle from the average pose of the robot. In other words, the landmark location may be also determined by subtracting a relative displacement from the average pose of the particle.

If the location of each particle is expressed as (x,y) and the average location of particles is set to $(\bar{x}, \bar{y})$, the landmark location $(\mu_x', \mu_y')$ observed from each location of particles changes as described below.

$\mu'_{ix} = \mu_{ix} - dx$ $\mu'_{iy} = \mu_{iy} - dy, (i=1, \ldots, N)$ $dx = x - \bar{x}$ $dy = y - \bar{y}$ [Equation 8]

Next, the landmark is observed, as shown in FIG. 2, from each pose of paths obtained in Equation 6 by using a sensor such as laser or ultrasonic waves (Operation 13).

When observation of each landmark is completed, it is determined whether there is a new landmark among the observed landmarks (Operation 14). A new landmark can be determined by a known data association method. For example, a maximum likelihood method, a nearest neighbor method, or a Chi-square test method may be used as the data association method.

If a landmark is determined to be a new landmark, the location of the new landmark is initialized using the observed r, φ values according to Equations 1 and 2 (Operation 15).

If it is determined that there is no new landmark in Operation 14, offspring is generated from the present chromosome according to the evolutionary computation method (Operation 16). The evolutionary computation method can use a random distribution. Non-limiting examples of such a random distribution include a Gaussuian distribution and a Cauchy distribution. In the present embodiment, the offspring $\mu_{i,t}$ is generated from parents $\mu_{i,t-1}$ according to a Gaussian mutation method using a Gaussian distribution as described below. In order for a more rapid convergence, a different distribution such as the Cauchy distribution may be used.

$\mu_{i,t} = \mu_{i,t-1} + \sigma_{i,t} \cdot N_i(0,1)$ [Equation 9]

$N_i(0,1)$ denotes a random value of the $i^{th}$ landmark according to the Gaussian distribution of mean 0 and variance 1, and the $\sigma_i$ denotes variance of the $i^{th}$ landmark.

In Equation 9, the variance $\sigma_{i,t}$ which is multiplied by the Gaussian distribution is obtained as described below.

$$\sigma_{i,t} = \sigma_{i,t-1} \cdot \exp(\tau' \cdot N(0,1) + \tau \cdot N_i(0,1)) \qquad \text{[Equation 10]}$$

Here, N( ) has the same value for every landmark according to the Gaussian distribution, and the $\tau'$ and $\tau$ are constants determined according to the number of landmarks.

If the offspring is generated, fitness of the parents and the offspring is evaluated (Operation 17). The evaluation of fitness is defined as the objective function $w_t$ according to the difference between the observation value and the prediction value of each landmark.

$$w_t = (z_t - \hat{z}_{n_p,t})^T R^{-1} (z_t - \hat{z}_{n_p,t}) \qquad \text{[Equation 11]}$$

Here, T denotes a transpose, R denotes a constant covariance matrix, and $z_t$ denotes an observation value, and $\hat{z}_{n_p,t}$ is an estimation value. The prediction value is a value that predicts the relative distance and angle of the landmark from the present location of the robot when $\theta_{nt}$ is set to $(\mu'_x, \mu'_y)$ in the observation function of Equation 1 and the $s_t$ is sets to an prediction value of the robot pose according to Equation 5.

In Equation 11, R, which is a constant covariance matrix determined by a user, is a variance value of the observation value. For example, when the distance from a robot to a landmark is observed by the robot, it may be R=0.1 if the variance of the measured value is 0.1.

Landmarks selected according to the objective function of Equation 11 and landmarks initialized in Operation 15 are selected as next-generation landmarks (Operation 16). The next generation is selected (Operation 18). The selection is made by using a random roulette wheel method, a random competition method or a tournament method, etc., which are used in the evolutionary computation method according to the result after calculating the objective function of Equation 11.

After the next-generation is selected, it is determined if the process is complete (Operation 19). If the process is complete, the process ends. If the process is not complete, the process returns to Operation 10.

Figure 3:
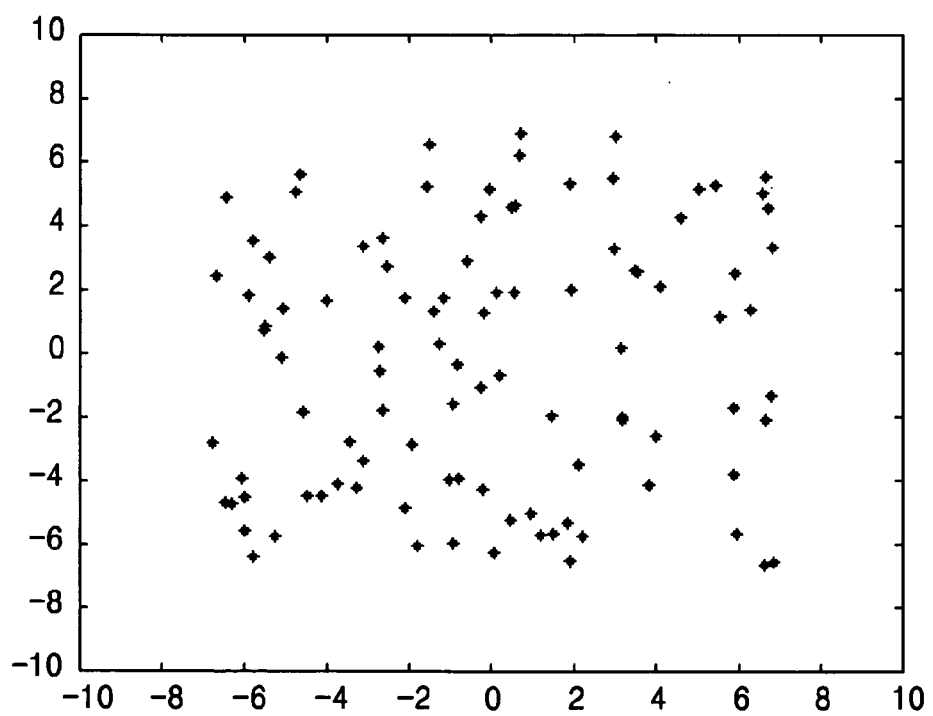
FIG. 3 describes test surroundings used to test one embodiment of the present invention.
Figure 4:
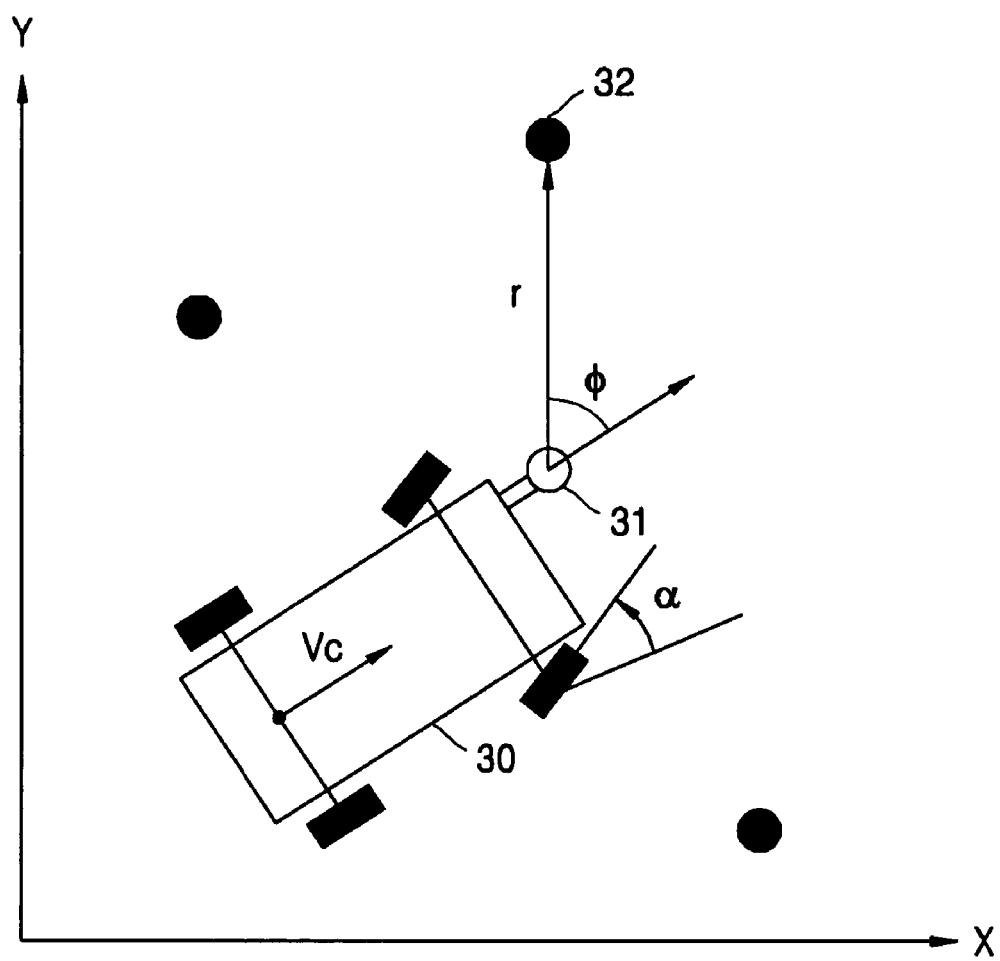
FIG. 4 illustrates a robot to which an embodiment of the present invention is applied.

FIG. 3 shows an example of test surroundings used to test one embodiment of the present invention, in which 100 landmarks are randomly generated in a two-dimensional plane of 7 m×7 m. FIG. 4 illustrates a robot to which an embodiment of the present invention is applied. Reference numeral 30 indicates a robot, and reference numeral 31 indicates a sensor, and reference numeral 32 indicates a landmark.

For example, the robot 30 moves at a speed of Vc=0.7 m/sec, and a front wheel of the robot is inclined about R($\alpha$) =5° from the forward direction. When the landmark 32 is observed using the sensor 31, the variance of the observation value is R($\phi$)=3°, R(r)=0.1. The variance R(r) of the distance from the sensor 31 to the landmark 32 linearly increases by ¼ whenever it exceeds 1 meter.

Figure 5A:
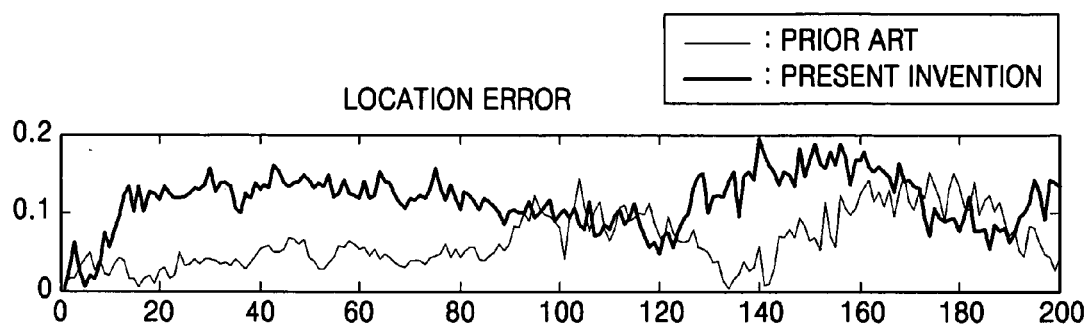
FIGS. 5A and 5B illustrate test results of methods for simultaneous localization and map-building of the conventional art and an embodiment of the present invention, respectively, in cases where the number of particles is 100 and the number of landmarks is 100.
Figure 5B:
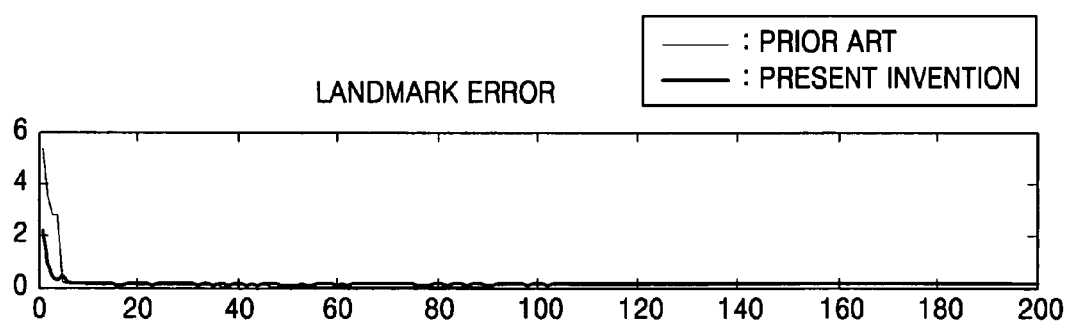

FIGS. 5A and 5B illustrate conventional test results using a Kalman filter and the method for simultaneous localization and map-building of the present invention in a case where the number of both particles and landmarks is 100. FIG. 5A illustrates an error of the robot location as to the time step, i.e., $\sqrt{(x_{err}^2 + y_{err}^2)}$, and FIG. 5B illustrates an error of the landmark location with respect to the time step.

As shown in FIGS. 5A and 5B, the conventional results and results of the present embodiment show a similar error level as to the robot pose; however, it can be seen that the landmark location of the present embodiment has a faster convergence speed than the conventional landmark location.

Figure 6A:
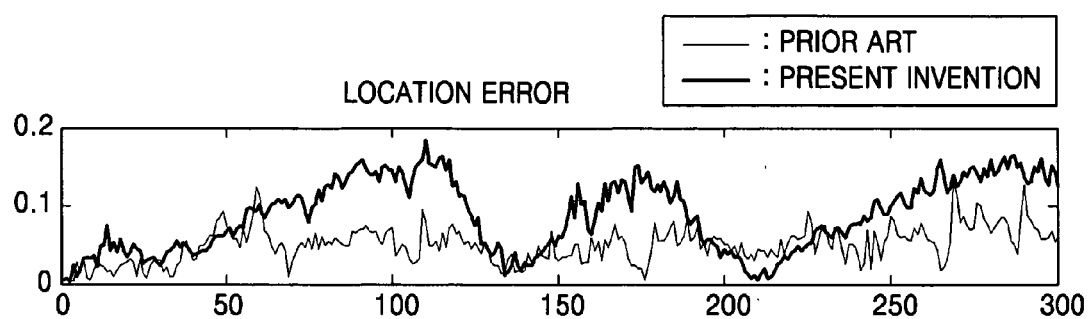
FIGS. 6A and 6B illustrate test results of methods for simultaneous localization and map-building of the conventional art and an embodiment of the present invention, respectively, in cases where the number of particles is 100 and the number of landmarks is 200, respectively.
Figure 6B:
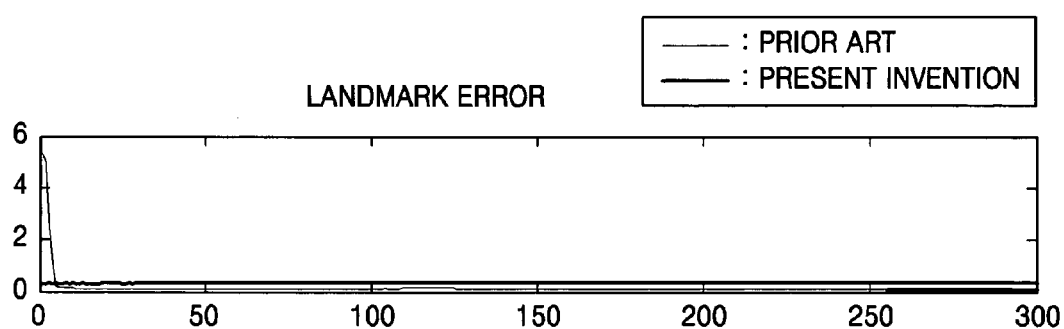

FIGS. 6A and 6B illustrate respective test result of the method for simultaneous localization and map-building of the conventional art and the present embodiment in a case where the number of particles and landmarks is 100 and 200, respectively. FIG. 6A illustrates an error of the robot location as to the time step, and FIG. 6B illustrates an error of the landmark location as to the time step.

As shown in FIGS. 6A and 6B, similarly to FIG. 5A, the conventional results and results of the present embodiment show a similar error level as to the robot pose; however, it can be seen that the landmark location of the present invention has faster convergence speed than the conventional landmark location.

Figure 7:
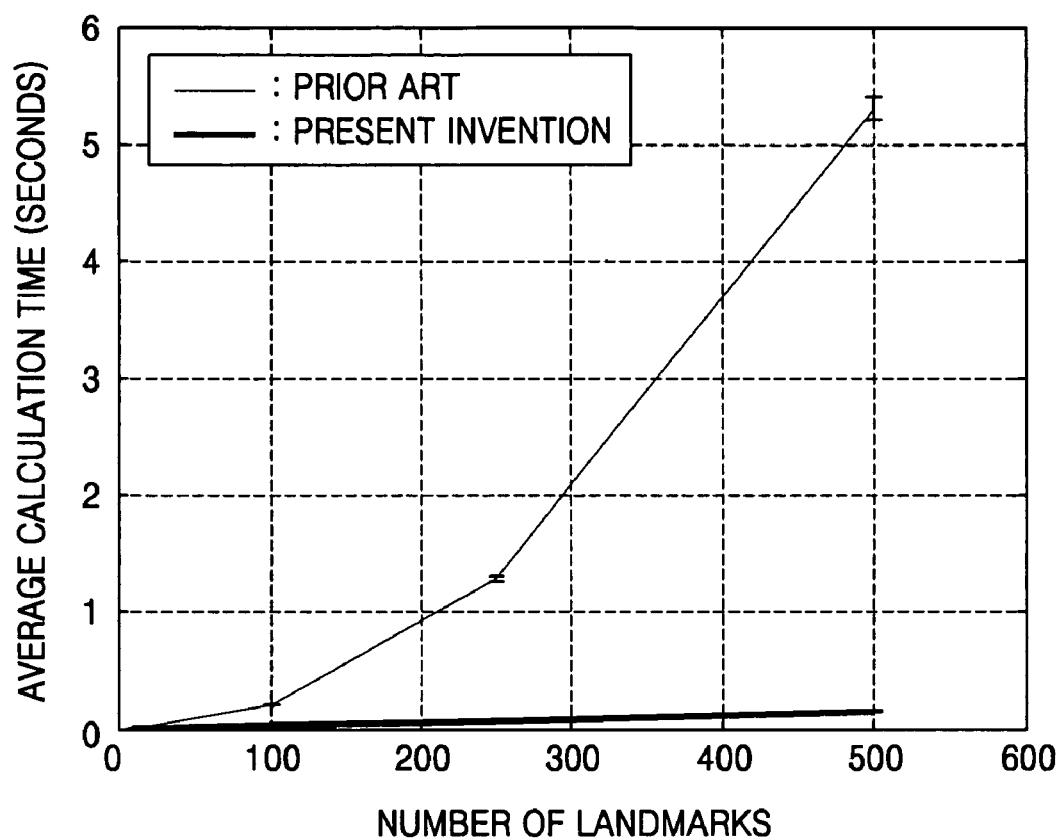
FIG. 7 is an error-bar plot of the average calculation time over the number of landmarks to 10, 100, 250, and 500 when the number of particles is 100 and the average calculation time is measured 300 times per each iteration and a total of 20 iterations, respectively according to the conventional art and an embodiment of the present invention.

FIG. 7 is an error-bar type plot of the average calculation time over the number of landmarks to 10, 100, 250, and 500 when the number of particles is 100 and the average calculation time is measured 300 times per each iteration and a total of 20 iterations, respectively. In the error bar, the average of time is expressed as a bended line graph, and the standard deviation of each time is expressed as a length of a T-shaped line segment.

As shown in the figure, it can be seen that the present embodiment is much faster than the conventional art whenever the number of landmarks increases. When the number of landmarks is 500, it can be seen that the present embodiment is about 40 times as fast as the conventional art.

Embodiments of the present invention, including the above-described embodiment, may be realized in a computer-readable recording medium as a computer-readable code. The computer-readable recording medium includes every kind of recording device that stores computer system-readable data. As a computer-readable recording medium, ROM, RAM, CD-ROM, magnetic tape, floppy disc, optical data storage, etc. are used. The computer-readable recording medium also includes realization in the form of a carrier wave (e.g., transmission through Internet). The computer-readable recording medium is dispersed in a network-connecting computer system, thereby storing and executing a computer-readable code by a dispersion method.

The above-described embodiment of the present invention avoids calculations such as a matrix inversion, differentiation, etc. required for setting locations of landmarks according to the conventional art, thereby reducing calculation time. The evolutionary computation basically enables parallel processing, thereby much reducing calculation time when multi-processors are adopted.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A method used by a robot for simultaneous localization and map-building, comprising:

initializing a pose of the robot and locations of landmarks;

sampling a new pose of the robot during motion of the robot, and constructing chromosomes using the locations of the landmarks;

observing the landmarks from a present location of the robot;

generating offspring from the chromosomes using a random value of one of the landmarks according to a Gaussian distribution and a variance of the one of the landmarks; and selecting next-generation chromosomes from the chromosomes and the offspring using observation values of the landmarks.

2. The method of claim 1, wherein the initializing of the pose of the robot is implemented by generating a plurality of particles based on the pose of the robot.

3. The method of claim 2, wherein the locations of the landmarks are determined from values obtained after observing distances and directions from the locations of each of the particles to the landmarks.

4. The method of claim 3, wherein the initial locations of the landmarks $(\mu_{x,0}, \mu_{y,0})$ are determined by an inverse function of an observation function in which a distance is expressed as $r$, a direction is expressed as $\phi$, and the initial pose of the robot is expressed as $(S_{0,x}, S_{0,y}, S_{0,\theta})$, the observation function being $$g(s_t, \theta_{nt}) = \begin{bmatrix} r(s_t, \theta_{nt}) \\ \phi(s_t, \theta_{nt}) \end{bmatrix}$$

$$= \begin{bmatrix} \sqrt{(\theta_{nt,x} - s_{t,x})^2 + (\theta_{nt,y} - s_{t,y})^2} \\ \tan^{-1}\left(\frac{\theta_{nt,y} - s_{t,y}}{\theta_{nt,x} - s_{t,x}}\right) - s_{t,\theta} \end{bmatrix},$$

wherein $\theta_{nt}$ represents the (x,y) coordinates of the landmark $n_t$, and $t$ represents a time step, and wherein the initial poses of the landmarks is determined by the following equations:

$$\mu_{x,t} = s_{t,x} + r\cos(\phi + s_{t,\theta})$$

$$\mu_{y,t} = s_{t,y} + r\sin(\phi + s_{t,\theta}).$$

5. The method of claim 2, wherein sampling the new pose of the robot is determined by a motion model obtained after predicting a motion of the robot at an end position of a path that the robot moved at a previous time according to a specified motion command.

6. The method of claim 2, wherein the constructing chromosomes obtains chromosomes of a present time from the locations of the landmarks if the present time is an initial time, or from a chromosome selected in a previous time if the present time is not the initial time,
wherein the chromosome selected in the previous time is a next-generation chromosome of the previous time.

7. The method of claim 2, wherein the constructing chromosomes obtains chromosomes of a present time from the location of the landmarks if the present time is an initial time, or from reflecting an average displacement of locations of the particles in a chromosome selected in a previous time if the present time is not the initial time,
wherein the chromosome selected in the previous time is a next-generation chromosome of the previous time.

8. The method of claim 7, wherein the chromosome of the present time is determined by the following equations $$\mu'_{ix} = \mu_{ix} - dx$$

$$\mu'_{iy} = \mu_{iy} - dy, (i=1, \ldots, N)$$

$$dx = x - \bar{x}$$

$$dy = y - \bar{y}$$

wherein $(\mu'_{ix}, \mu'_{iy})$ denotes the chromosome of the present time, $(\mu_{ix}, \mu_{iy})$ denotes the chromosome selected in the previous time, $(x,y)$ denotes the location of each particle, and $(\bar{x}, \bar{y})$ denotes the average location of particles.

9. The method of claim 1, wherein the generation of the offspring is generated by a Gaussian mutation method according to the following equation, an $i^{th}$ chromosome being expressed as $\mu_{i,t-1}$, and offspring of the ith chromosome being expressed as $\mu_{i,t}$, $$\mu_{i,t} = \mu_{i,t-1} + \sigma_{i,t} \cdot N_i(0,1),$$

wherein $N_i(0, 1)$ is a random value obtained by a Gaussian distribution of mean 0 and variance 1 of an $i^{th}$ landmark, and $v_i$ is a variance of an $i^{th}$ landmark.

10. The method of claim 9, wherein $\sigma_i$ is determined by $$\sigma_{i,t} = \sigma_{i,t-1} \cdot \exp(\tau' \cdot N(0,1) + \tau \cdot N_i(0,1)),$$

wherein $N(0, 1)$ has the same value for every landmark according to the Gaussian distribution, and $\tau'$ and $\tau$ are constants.

11. The method of claim 1, wherein the selecting of the next-generation chromosomes includes:
evaluating a conformance of the offspring and the chromosomes; and
selecting the next-generation chromosome by a specified method based on the conformance.

12. The method of claim 11, wherein the conformance is calculated in a case where an observation value of a landmark $n_t$ at time t is z, and a prediction value is $\hat{z}_{n_t,t}$, by an objective function $w_t$ according to a difference between the two values by the following equation:

$$w_t = (z_t - \hat{z}_{n_t,t})^T R^{-1} (z_t - \hat{z}_{n_t,t}),$$

wherein T is a transpose, and R is a constant covariance matrix.

13. The method of claim 12, wherein $\hat{z}_{n_t,t}$ is predicted by the following equation, in a case where $\theta_{nt}$ is a chromosome, and $s_t$ is a prediction value of a pose of the robot:

$$g(s_t, \theta_{nt}) = \begin{bmatrix} r(s_t, \theta_{nt}) \\ \phi(s_t, \theta_{nt}) \end{bmatrix}$$

$$= \begin{bmatrix} \sqrt{(\theta_{nt,x} - s_{t,x})^2 + (\theta_{nt,y} - s_{t,y})^2} \\ \tan^{-1}\left(\frac{\theta_{nt,y} - s_{t,y}}{\theta_{nt,x} - s_{t,x}}\right) - s_{t,\theta} \end{bmatrix}.$$

14. The method of claim 1, wherein the observing includes:
determining whether a new landmark is generated; and
initializing a location of a generated landmark, if a new landmark is generated.

15. The method of claim 14, wherein determining whether a new landmark is generated is determined by a data association method.

16. The method of claim 14, wherein the selecting of the next-generation chromosomes includes:
evaluating fitness of the offspring chromosomes; and
selecting the next-generation chromosomes by a specified method based on the fitness or an objective function.

17. A non-transitory computer-readable storage medium encoded with processing instructions for causing a processor to perform a method used by a robot for simultaneous localization and map-building, the method comprising:
initializing a pose of a robot and locations of landmarks;
sampling a new pose of the robot during motion of the robot, and constructing chromosomes using the locations of the landmarks;
observing the landmarks from a present location of the robot;

generating offspring from the chromosomes using a random value of one of the landmarks according to a Gaussian distribution and a variance of the one of the landmarks; and selecting next-generation chromosomes from the chromosomes and the offspring using observation values of the landmarks.

18. A method of simultaneous localization and map-building, comprising:

initializing a pose of a robot and a location of a landmark, the pose including a direction in which a front of the robot faces and x,y coordinates indicating a location of the robot;

sampling a new position of the robot as the robot moves;

constructing a chromosome for an evolutionary computation, the chromosome indicating the location of the landmark and being an object in the evolutionary computation;

observing the landmark from the new position;

determining whether a new landmark is present and, if so, initializing a location of the new landmark using an observed distance and angle from the robot to the landmark;

generating, when a new landmark is determined not to be present, offspring from a present parent chromosome using a random value of one of the landmarks according to a Gaussian distribution and a variance of the one of the landmarks;

evaluating fitness of the parent and the offspring, fitness being defined as an objective function according to a difference between an observation value and a prediction value of each landmark; and selecting a next generation chromosome from the parents and the offspring based on fitness values.

19. The method of claim 18, wherein the observing is performed using a sensor.

20. The method of claim 18, wherein the new landmark is determined by a data association method.

21. The method of claim 20, wherein the offspring are generated according to a mutation method using the Gaussian distribution.

22. The method of claim 20, wherein selecting is performed using a random roulette wheel method, a random competition method, or a tournament method.

* * * * *